US012570259B2

(12) United States Patent
Seol

(10) Patent No.: US 12,570,259 B2
(45) Date of Patent: Mar. 10, 2026

(54) METHOD AND APPARATUS FOR DETERMINING SOLENOID VALVE FAILURE OF BRAKE SYSTEM

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 861 days.

(21) Appl. No.: 17/847,936

(22) Filed: Jun. 23, 2022

(65) Prior Publication Data

US 2023/0001901 A1 Jan. 5, 2023

(30) Foreign Application Priority Data

Jul. 1, 2021 (KR) ........................ 10-2021-0086228

(51) Int. Cl.
B60T 13/74 (2006.01)
B60T 8/88 (2006.01)
(Continued)

(52) U.S. Cl.
CPC ................ B60T 8/94 (2013.01); B60T 8/885 (2013.01); B60T 13/147 (2013.01);
(Continued)

(58) Field of Classification Search
CPC ................. B60T 13/745; B60T 13/686; B60T 2270/402; B60T 2270/404; B60T 2270/406; B60T 8/885; B60T 8/94
See application file for complete search history.

(56) References Cited

U.S. PATENT DOCUMENTS 6,213,572 B1 * 4/2001 Linkner, Jr. .......... B60T 8/4072
303/119.2
6,416,138 B1 * 7/2002 Barnett ................. B60T 17/225
303/3
(Continued)

FOREIGN PATENT DOCUMENTS

CN 102529934 A 12/2011
CN 105339224 A 2/2016
(Continued)

OTHER PUBLICATIONS

Chinese Office Action issued Jan. 6, 2026 in corresponding Chinese Patent Application No. 202210756973.2.

*Primary Examiner* — Bradley T King
(74) *Attorney, Agent, or Firm* — NovoTechIP International PLLC

(57) ABSTRACT

According to at least one embodiment, the present disclosure provides a method for determining failure of a solenoid valve in a brake system, the method comprising: a first valve operation process of opening a backup valve that controls opening and closing of a flow path disposed between a master cylinder and a pedal cylinder and opening and closing a plurality of valves other than the backup valve in a preset manner; a first determination process of moving a piston disposed in a master cylinder to a preset first position and determining whether the backup valve is in a failure state using a pressure sensor; a second valve operation process of closing a mixing valve that controls opening and closing of a flow path disposed between a front wheel circuit and a rear wheel circuit, and opening and closing the plurality of valves other than the mixing valve in a preset manner; and a second determination process of moving the piston disposed in the master cylinder to a preset second
(Continued)

position and determining whether the mixing valve is in a failure state using a pressure sensor.

13 Claims, 8 Drawing Sheets

(51) Int. Cl.
*B60T 8/94* (2006.01)
*B60T 13/14* (2006.01)

(52) U.S. Cl.
CPC ....... *B60T 13/745* (2013.01); *B60T 2270/402* (2013.01); *B60T 2270/406* (2013.01); *B60T 2270/88* (2013.01)

(56) References Cited

U.S. PATENT DOCUMENTS

| | | | | |
|---|---|---|---|---|
| 6,450,591 | B1 * | 9/2002 | Kawahata | B60T 8/3655 |
| | | | | 303/122.05 |
| 7,673,948 | B2 * | 3/2010 | Otomo | B60T 8/4081 |
| | | | | 303/114.1 |
| 8,888,197 | B2 * | 11/2014 | Miyazaki | B60T 8/94 |
| | | | | 303/122.1 |
| 9,776,605 | B2 * | 10/2017 | Miyazaki | B60T 8/4081 |
| 10,124,783 | B2 * | 11/2018 | Spieker | B60T 7/042 |
| 11,767,003 | B2 * | 9/2023 | Nakayasu | B60T 13/686 |
| | | | | 303/6.01 |
| 12,325,392 | B2 * | 6/2025 | Sakata | B60T 8/26 |
| 2007/0108837 | A1 * | 5/2007 | Ohkubo | B60T 8/90 |
| | | | | 303/122.08 |
| 2007/0159001 | A1 * | 7/2007 | Miyazaki | B60T 8/3275 |
| | | | | 303/113.4 |
| 2008/0084107 | A1 * | 4/2008 | Yanai | B60W 10/188 |
| | | | | 701/70 |
| 2011/0175436 | A1 * | 7/2011 | Nakata | B60T 8/4081 |
| | | | | 303/6.01 |
| 2011/0291470 | A1 * | 12/2011 | Drumm | B60T 7/042 |
| | | | | 303/3 |
| 2012/0161506 | A1 * | 6/2012 | Tanaka | B60T 8/4081 |
| | | | | 303/14 |
| 2012/0283926 | A1 * | 11/2012 | Ito | B60L 3/0038 |
| | | | | 701/70 |
| 2015/0028666 | A1 * | 1/2015 | Linhoff | B60T 8/4077 |
| | | | | 303/14 |
| 2015/0266457 | A1 * | 9/2015 | Johnson | B60T 7/042 |
| | | | | 303/15 |
| 2016/0221559 | A1 * | 8/2016 | Kim | B60T 13/745 |
| 2016/0221562 | A1 * | 8/2016 | Leiber | B60T 8/4081 |
| 2017/0050629 | A1 * | 2/2017 | Kim | B60T 13/662 |
| 2019/0063377 | A1 * | 2/2019 | Dudar | F02D 41/029 |
| 2019/0275997 | A1 * | 9/2019 | Park | B60T 13/18 |
| 2019/0344769 | A1 * | 11/2019 | Zimmermann | B60T 8/326 |
| 2020/0114893 | A1 * | 4/2020 | Kim | B60T 13/745 |
| 2020/0216048 | A1 * | 7/2020 | Lee | B60T 7/042 |
| 2020/0353910 | A1 * | 11/2020 | Seol | B60T 13/142 |
| 2021/0070273 | A1 * | 3/2021 | Timm | B60T 17/221 |
| 2021/0146908 | A1 * | 5/2021 | Ganzel | B60T 13/745 |
| 2023/0092049 | A1 * | 3/2023 | Kim | B60Q 9/00 |
| | | | | 701/70 |

FOREIGN PATENT DOCUMENTS

| | | |
|---|---|---|
| JP | 2012-131438 A | 7/2012 |
| KR | 10-2020-0129769 A | 11/2020 |

* cited by examiner

METHOD AND APPARATUS FOR DETERMINING SOLENOID VALVE FAILURE OF BRAKE SYSTEM

CROSS-REFERENCE TO RELATED APPLICATIONS

This application is based on, and claims priority from, Korean Patent Application Number 10-2021-0086228, filed Jul. 21, 2021, the disclosure of which is incorporated by reference herein in its entirety.

BACKGROUND

1. Technical Field

The present disclosure relates to a device and method for determining failure of a solenoid valve in a brake system. More particularly, the present disclosure relates to a device and method for determining failure of a solenoid valve in a brake system for determining mechanical failure of the solenoid valve used for hydraulic control of the brake system.

2. Discussion of Related Art

The content described in this part simply provides background information on the present disclosure and does not constitute the prior art.

In general, a brake system includes an anti-lock brake system (ABS) for preventing wheel slipping during braking, a brake traction control system (BTCS) for preventing slippage of driving wheels when a vehicle starts or accelerates rapidly, and an electronic stability control system (ESC) for maintaining the driving state of a vehicle stably by controlling a brake oil pressure by combining the anti-lock brake system and the traction control.

An ESC integrated brake system includes a reservoir, a pedal cylinder, a master cylinder, a motor, a wheel cylinder, a control unit, and a plurality of hydraulic control valves. A pedal displacement sensor detects a driver's brake pedal operation and drives the motor, the rotational driving force of the motor is converted into linear motion through a ball screw to advance a piston in the main master cylinder, and a braking pressure is generated in the master cylinder by the advance of the piston. Since a brake pedal operation is transmitted as an electrical signal through a pedal displacement sensor, a motor, and the like, a pedal simulator is provided as a means to provide pedal force or pedal feel to the driver, and the pedal simulator forms a hydraulic reaction force in the pedal cylinder so that the driver can feel an appropriate pedal force or pedal feel when operating the brake pedal.

The ESC integrated brake system includes a plurality of hydraulic control valves, and the valve that controls opening and closing of a flow path between the pedal cylinder and the master cylinder is always closed during braking. Accordingly, if the valve is mechanically closed and stuck due to failure, there is a problem that a backup pressure cannot be transmitted.

In addition, the mixing valve that controls opening and closing of a flow path between a front wheel circuit and a rear wheel circuit is always open during braking. Accordingly, if the mixing valve is mechanically open and stuck due to failure, there is a problem in that the entire amount of brake oil is exhausted in a circuit leak situation, which makes braking impossible.

SUMMARY

According to at least one embodiment, the present disclosure provides a method for determining failure of a solenoid valve in a brake system, the method comprising: a first valve operation process of opening a backup valve that controls opening and closing of a flow path disposed between a master cylinder and a pedal cylinder and opening and closing a plurality of valves of the brake system excluding the backup valve in a preset manner; a first determination process of moving a piston disposed in a master cylinder to a preset first position and determining whether the backup valve is in a failure state using a pressure sensor; a second valve operation process of closing a mixing valve that controls opening and closing of a flow path disposed between a front wheel circuit and a rear wheel circuit, and opening and closing the plurality of valves of the brake system excluding the mixing valve in a preset manner; and a second determination process of moving the piston disposed in the master cylinder to a preset second position and determining whether the mixing valve is in a failure state using a pressure sensor.

According to at least one embodiment, the present disclosure provides a brake device comprising: a pedal cylinder, connected to a reservoir in which brake oil is stored, which generates hydraulic pressure by pressing a brake pedal; a motor driven by an electrical signal output corresponding to or indicative of displacement of the brake pedal; a master cylinder connected to the pedal cylinder and including a piston moving forward and backward by driving of the motor, the master cylinder generating a braking hydraulic pressure using the piston; a control unit that detects failure of a backup valve for adjusting opening and closing of a flow path between the master cylinder and the pedal cylinder and failure of a mixing valve for adjusting opening and closing of a flow path between a front wheel circuit and a rear wheel circuit; and a plurality of valves provided in flow paths connecting the reservoir to wheel cylinders that perform braking of respective wheels, the plurality of valves being opened and closed under the control of the control unit.

DETAILED DESCRIPTION

Figure 1:
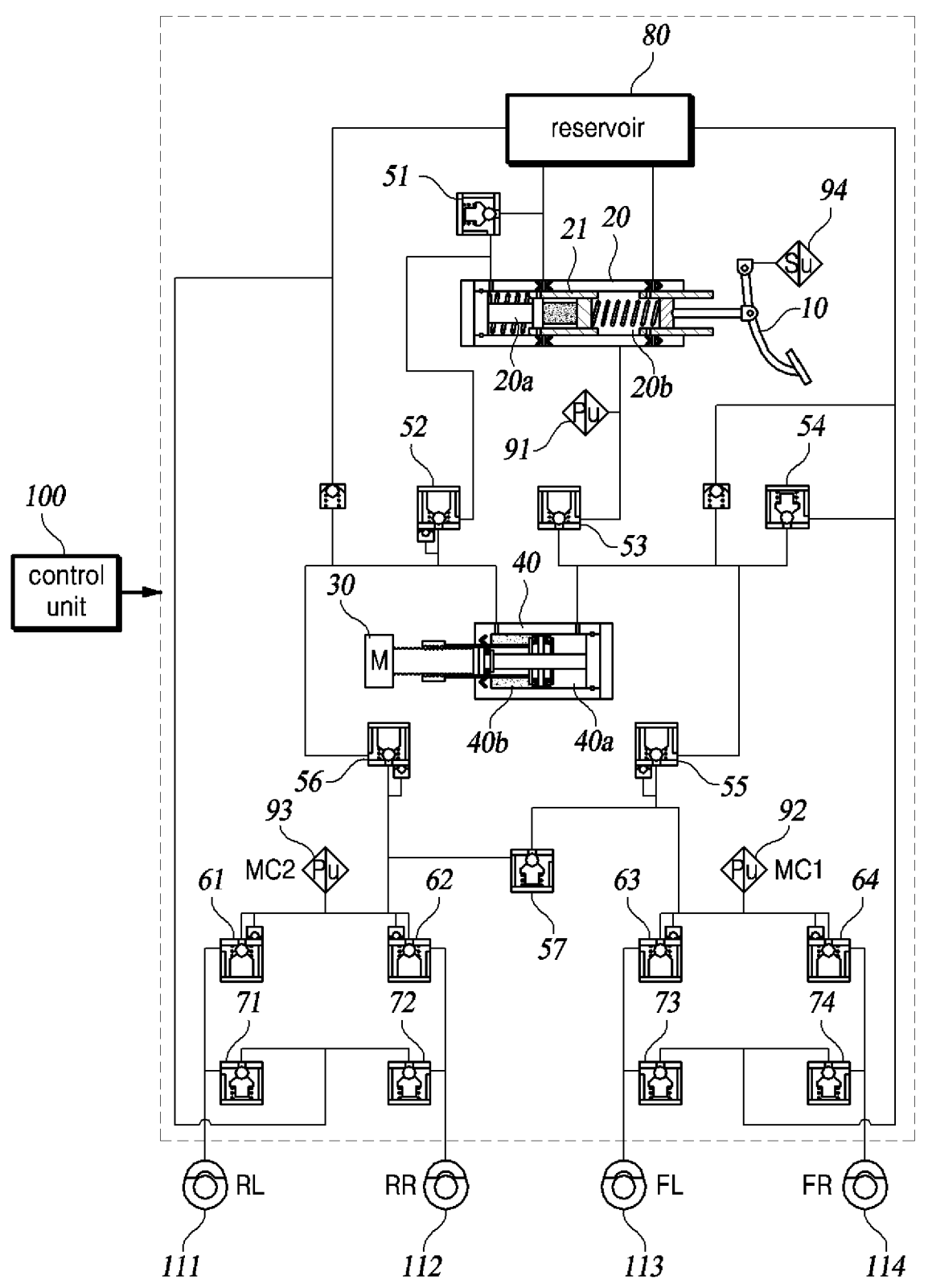
FIG. 1 is a hydraulic circuit diagram of a brake system according to one embodiment of the present disclosure.

In view of the above, the present disclosure provides a method for determining failure of a solenoid valve in a brake system which is capable of detecting a close-stuck of a valve that controls opening and closing of a flow path between a pedal cylinder and a master cylinder.

Further, the present disclosure provides a method for determining failure of a solenoid valve in a brake system which is capable of detecting an open-stuck of a mixing valve that controls opening and closing of a flow path between a front wheel circuit and a rear wheel circuit.

The objects to be achieved by the present disclosure are not limited to the above-mentioned objects, and other objects not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' module,' and the like refer to one or more units for processing at least one function or operation, which may be implemented by hardware, software, or a combination thereof.

FIG. 1 is a hydraulic circuit diagram of a brake system according to one embodiment of the present disclosure.

Referring to FIG. 1, the brake system according to one embodiment of the present disclosure may include all or part of a reservoir 80, a pedal cylinder 20, a motor 30, a master cylinder 40, wheel cylinders 111, 112, 113, and 114, hydraulic control valves 51, 52, 53, 54, 55, and 56, a mixing valve 57 and a control unit 100.

The reservoir 80 is coupled to an upper portion of the pedal cylinder 20 to store brake oil. The pedal cylinder 20 generates hydraulic pressure by pressing a brake pedal 10. The pedal cylinder 20 may include a first chamber 20a, a second chamber 20b, and a pedal simulator 21.

When a pedal force of a driver is applied to the brake pedal 10, hydraulic pressure is generated by the pedal cylinder 20. The generated hydraulic pressure is supplied to a piston of the pedal simulator 21 to pressurize an elastic body of the pedal simulator 21, and the driver can feel a pedal feel by a reaction force of the pressed elastic body. When the driver presses the brake pedal, a stroke sensor 94 for detecting a depression amount of the brake pedal 10 may be provided at the brake pedal 10.

The motor 30 operates by an electrical signal output in response to displacement of the brake pedal 10. The control unit 100 may receive a signal from the stroke sensor 94 of the brake pedal 10 to control the driving of the motor 30. A screw (not shown) may convert the rotational motion of the motor 30 into a linear motion to linearly move a piston of the master cylinder 40 in left and right directions. The master cylinder 40 is driven by the motor 30 controlled by the control unit 100 to generate hydraulic pressure and supplies the hydraulic pressure to the wheel cylinders 111, 112, 113, and 114 that perform braking of respective wheels RL, RR, FL, and FR. The control unit 100 may be an electronic control unit (ECU), which is a representative control device of a vehicle. The master cylinder 40 may include a third chamber 40a, a fourth chamber 40b, and a piston (not shown).

For example, when the driver steps on the brake pedal 10, the stroke sensor 94 senses a stroke of the brake pedal 10 and transmits the sensed stroke to the control unit 100. The control unit 100 controls the motor 30 based on the stroke of the brake pedal 10 detected by the stroke sensor 94 to control the hydraulic pressure generated by the master cylinder 40. As the brake pedal 10 is pressed, the motor 30 operates under the control of the control unit 100 to form a braking hydraulic pressure based on signals output from the stroke sensor 94 and a pedal cylinder pressure sensor 91, respectively.

The wheel cylinders 111, 112, 113, and 114 include a first wheel cylinder 111 for braking the rear left wheel RL of the vehicle, a second wheel cylinder 112 for braking the rear right wheel RR of the vehicle, a third wheel cylinder 113 for braking the front left wheel FL of the vehicle, and a fourth brake wheel 114 for braking the front right wheel FR of the vehicle.

Inlet valves 61, 62, 63, and 64 for controlling the brake oil supplied to the respective wheel cylinders 111, 112, 113, and 114 are provided, and outlet valves 71, 72, 73, and 74 for controlling the brake oil discharged from the respective wheel cylinders 111, 112, 113, and 114 are respectively provided in hydraulic flow paths between each of the wheel cylinders 111, 112, 113, and 114 and the reservoir 80.

The hydraulic pressure control valves 51, 52, 53, 54, 55, and 56 are provided in the hydraulic flow paths and opened and closed under the control of the control unit 100. The hydraulic pressure control valves 51, 52, 53, 54, 55, and 56 may include first to sixth hydraulic control valves.

The first hydraulic pressure control valve 51 is provided in the hydraulic flow path connecting the reservoir 80 and the first chamber 20a of the pedal cylinder 20.

The second hydraulic pressure control valve 52 is provided in the hydraulic flow path connecting the first chamber 20a of the pedal cylinder 20 and the fourth chamber 40b of the master cylinder 40.

The third hydraulic pressure control valve 53 is provided in the hydraulic flow path connecting the second chamber 20b of the pedal cylinder 20 and the third chamber 40a of the master cylinder 40. Hereinafter, the third hydraulic control valve 53 is referred to as a "backup valve 53".

The fourth hydraulic pressure control valve 54 is provided in the hydraulic flow path connecting the outlet valves 73 and 74 at the front side of the vehicle, the reservoir, and the third chamber 40a of the master cylinder 40. The fourth hydraulic control valve 54 may be omitted to reduce the production cost.

The fifth hydraulic pressure control valve 55 is provided in the hydraulic flow path connecting the third chamber 40a of the master cylinder 40 and the wheel cylinder.

The sixth hydraulic control valve 56 is provided in the hydraulic flow path connecting the fourth chamber 40b of the master cylinder 40 and the wheel cylinder.

The mixing valve 57 is provided in the hydraulic flow path connecting the fifth hydraulic control valve 55 and the wheel cylinders 113 and 114 at the front side of the vehicle, and the hydraulic flow path connecting the sixth hydraulic control valve 56 and the wheel cylinders 111 and 112 at the rear side of the vehicle. The mixing valve 57 is a valve that adjusts hydraulic pressure so that the hydraulic pressure is supplied to the plurality of wheel cylinders 111, 112, 113, and 114.

The hydraulic flow path connecting the fifth hydraulic control valve 55 and the wheel cylinders 113 and 114 at the front side of the vehicle is connected to the third chamber 40*a* of the master cylinder 40 and guides hydraulic pressure to the third and fourth wheel cylinders 113 and 114 respectively mounted on the two front wheels FL and FR. In addition, the hydraulic flow path connecting the fifth hydraulic control valve 55 and the wheel cylinders 113 and 114 at the front side of the vehicle may include a first pressure sensor 92 for measuring hydraulic pressure.

In addition, the hydraulic flow path connecting the sixth hydraulic control valve 56 and the wheel cylinders 111 and 112 at the rear side of the vehicle is connected to the fourth chamber 40*b* of the master cylinder 40 and guides hydraulic pressure to the first and second wheel cylinders 111 and 112 respectively mounted on the two rear wheels RL and RR. In addition, the hydraulic flow path connecting the sixth hydraulic control valve 56 and the wheel cylinders 113 and 114 at the rear side of the vehicle may include a second pressure sensor 93 for measuring hydraulic pressure. The second pressure sensor 93 may be deleted to reduce the production cost.

The first to sixth hydraulic control valves 51, 52, 53, 54, 55, and 56 and the mixing valve 57 may be normally operated valves and may be solenoid valves controlled by the control unit 100. The plurality of valves adjust the paths of pressure. For example, the vehicle is controlled by controlling seven normally operated valves 51 to 57, two check valves (not shown), and a braking pressure transmitted to each wheel. The check valves serves to prevent the brake oil from flowing back.

Although the pressure line is illustrated as an H-split type and the line is arranged to form pressure from the front wheels in the present embodiment, the pressure line is not limited thereto and may be configured as an X-split type.

Figure 2:
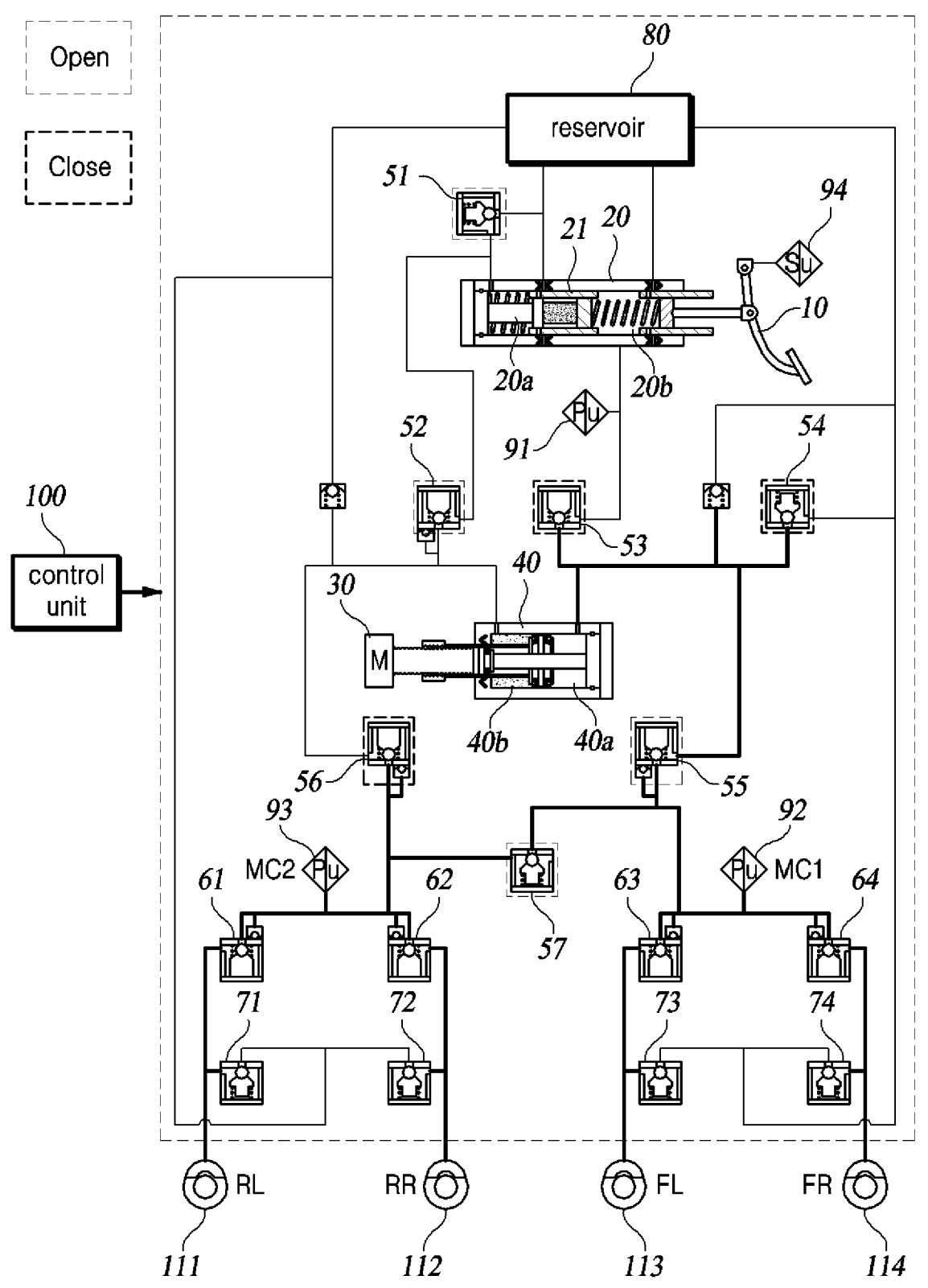
FIG. 2 is a hydraulic circuit diagram during a main braking operation of the brake system according to one embodiment of the present disclosure.

FIG. 2 is a hydraulic circuit diagram during a main braking operation of the brake system according to one embodiment of the present disclosure.

Referring to FIG. 2, during the main braking operation, the first hydraulic control valve 51, the second hydraulic control valve 52, the fifth hydraulic control valve 55, and the mixing valve 57 are opened, and the backup valve 53, the fourth hydraulic control valve 54, and the sixth hydraulic control valve 56 are closed. Each of the hydraulic pressure control valves 51 to 56 and the mixing valve 57 is opened and closed under the control of the control unit 100.

Referring to FIG. 2, the backup valve 53 always maintains the closed state during the main braking operation. Accordingly, even if the backup valve 53 is in a close-stuck state, that is, in a mechanical failure state, the brake system may operate normally. Since the brake system may operate normally even when the backup valve 53 is in a failure state, the control unit may not detect the failure. In order to transfer a backup pressure from the pedal cylinder 20 to the wheel cylinders 111 to 114, the backup valve 53 need to be opened, but when the backup valve 53 is in a close-stuck state due to failure, the backup pressure cannot be transferred.

In addition, the mixing valve 57 always maintains an open state during the main braking operation. Accordingly, even if the mixing valve 57 is in an open-stuck state, that is, in a mechanical failure state, the brake system may operate normally. Since the brake system may operate normally even when the mixing valve 57 is in a failure state, the control unit may not detect the failure. The mixing valve 57 serves to adjust hydraulic pressure between the front and rear wheel circuits and to allow the hydraulic pressure to be supplied to the plurality of wheel cylinders 111 to 114. If the mixing valve 57 is in an open-stuck state due to failure, there is a problem that the entire amount of brake oil is exhausted in a circuit leak situation, which makes braking impossible.

Figure 3:
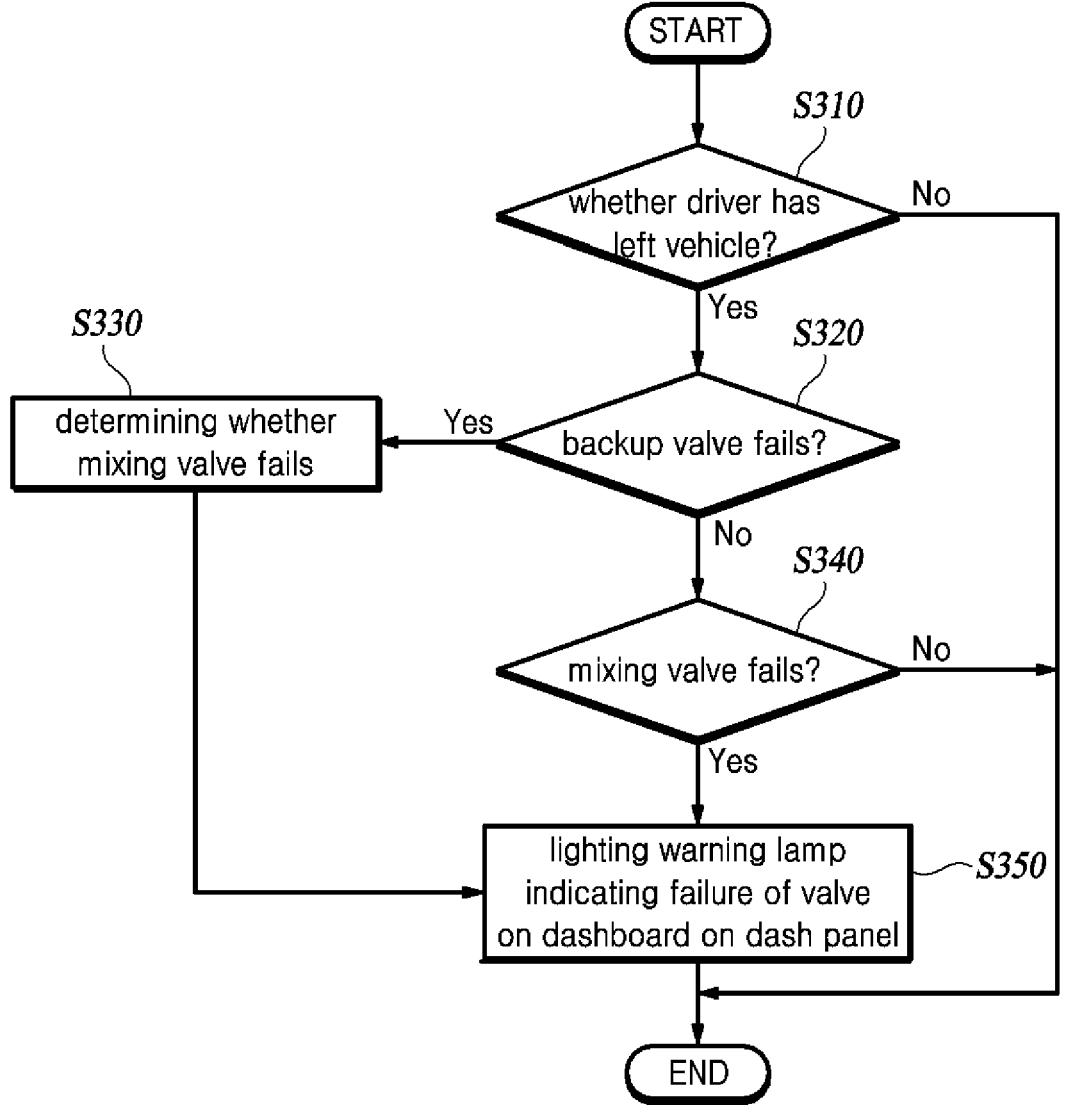
FIG. 3 is a flowchart of a method for determining failure of a solenoid valve in the brake system according to one embodiment of the present disclosure.

FIG. 3 is a flowchart of a method for determining failure of a solenoid valve in the brake system according to one embodiment of the present disclosure.

The method for determining the failure of the solenoid valve in the brake system according to one embodiment of the present disclosure operates when it is determined that the driver has left the vehicle after arriving at the destination (S310). For example, the control unit 100 operates after a predetermined time has elapsed after the brake and ignition are turned off, the door is opened and then closed again.

In a state in which the driver gets off the vehicle, the backup valve 53 is checked whether the backup valve 53 is in a close-stuck state due to mechanical failure (S320). After determining whether the backup valve 53 is in a mechanical failure state, it is checked whether the mixing valve 57 is in an open-stuck state due to mechanical failure. When it is determined that the backup valve 53 is in a failure state, it is checked whether the mixing valve 57 is in a failure state (S330), and a warning lamp indicating that the valve is in a failure state is lit on the dashboard on a dash panel so that the driver may recognize whether the valve is a failure state (S350). After the warning lamp is lit, the algorithm is terminated.

In addition, even when the backup valve 53 is not in a failure state, it is determined whether the mixing valve 57 is in a failure state (S340). When the mixing valve 57 is in a failure state, a warning lamp indicating that the valve is in a failure state is lit on the dashboard on the dash panel so that the driver may recognize whether the valve is in a failure state (S350). After the warning lamp is lit, the algorithm is terminated.

If the driver does not get out of the vehicle or both the backup valve 53 and the mixing valve 57 are not in a failure state, this algorithm is terminated. Hereinafter, a method for determining mechanical failure of the backup valve 53 and the mixing valve 57 will be described in detail.

Figure 4:
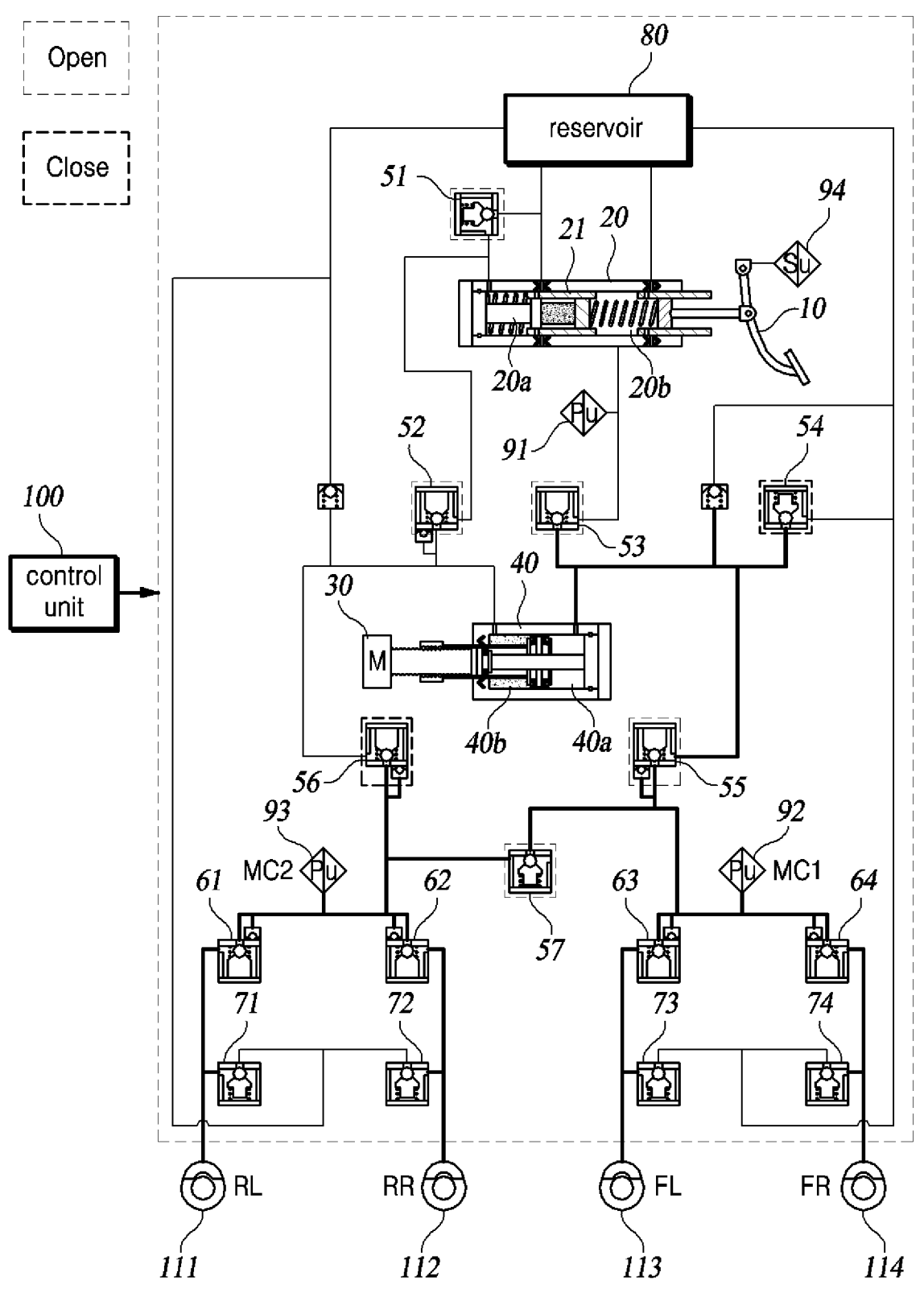
FIG. 4 is a hydraulic circuit diagram for checking a close stuck of a backup valve in the brake system according to one embodiment of the present disclosure.

FIG. 4 is a hydraulic circuit diagram for checking a close-stuck of the backup valve in the brake system according to one embodiment of the present disclosure.

Referring to FIG. 4, the control unit 100 applies a duty of the backup valve 53 as zero (or sets the duty of the backup valve 53 to zero) and commands the backup valve 53 to open. The control unit 100 opens and closes the valves 51, 52, 54, 55, 56, and 57 of the brake system excluding the backup valve 53 so that pressure may be formed in the wheel cylinders 111 to 114 when the piston located in the master cylinder 40 moves toward the third chamber 40*a*. For example, the first hydraulic control valve 51, the second hydraulic control valve 52, the fifth hydraulic control valve 55, and the mixing valve 57 are opened, and the fourth hydraulic control valve 54 and the sixth hydraulic control valve 56 are closed. After each valve operation is completed, the control unit 100 moves the piston forward to a preset first position toward the third chamber 40*a*.

After a predetermined time elapses after the piston has reached the first position, it is checked whether the backup valve 53 is in a mechanical close-stuck state using the first pressure sensor 92. When the backup valve 53 is opened in the hydraulic circuit design, the brake oil discharged from the third chamber 40*a* of the master cylinder 40 is directed to the second chamber 20b of the pedal cylinder 20 through the backup valve 53. Accordingly, when the backup valve 53 is opened without mechanical failure, hydraulic pressure is not formed in the front wheel circuit, and thus the first pressure sensor 92 measures no pressure. On the other hand, as in the case of FIG. 4, when the brake oil discharged from the third chamber 40a of the master cylinder 40 forms hydraulic pressure in the front wheel circuit through the fifth hydraulic control valve 55, the pressure is measured by the first pressure sensor 92. As a result, when a pressure exceeding a certain level is measured by the first pressure sensor 92, it may be determined that the backup valve 53 is in a mechanical close-stuck state due to failure.

Figure 5:
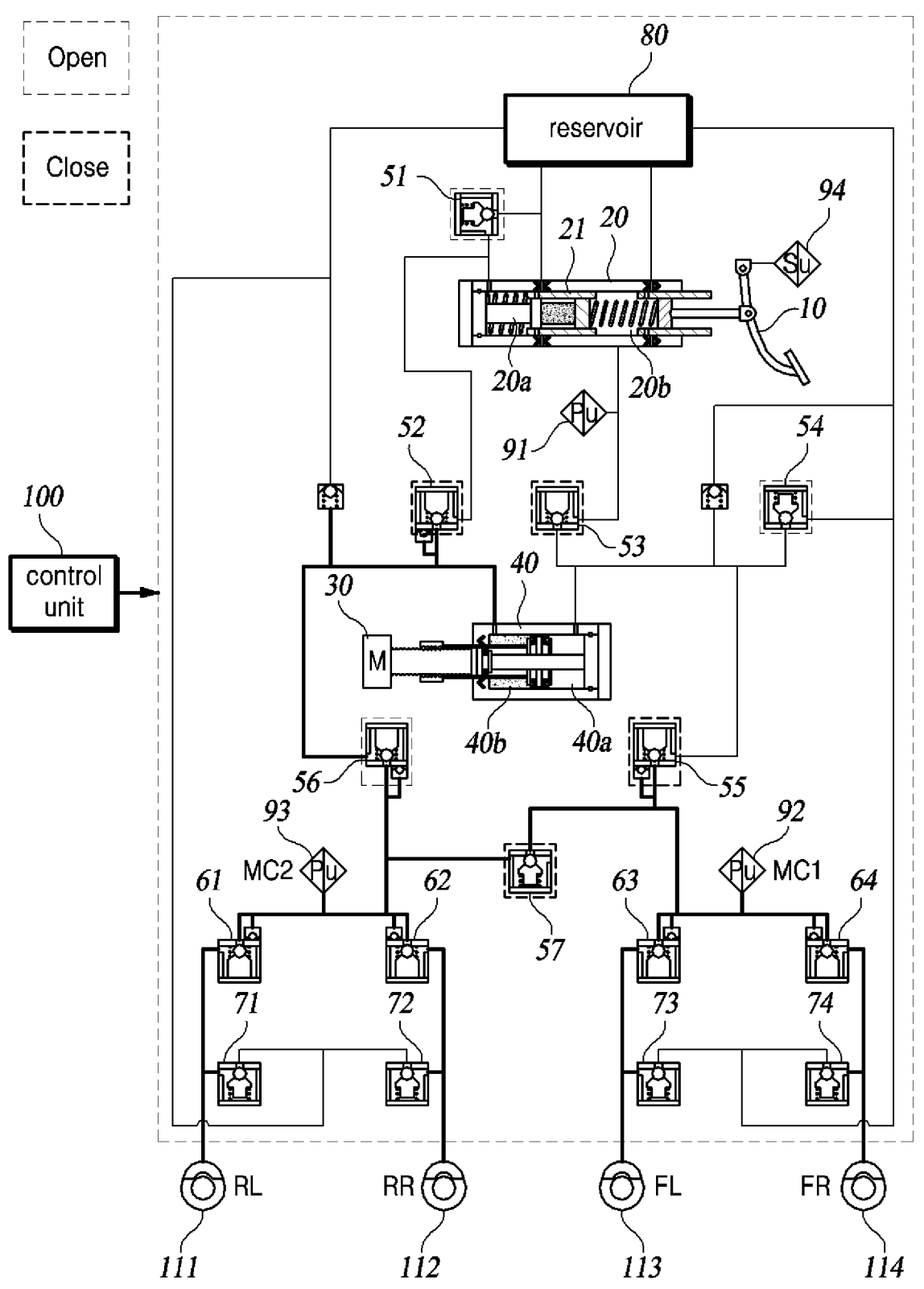
FIG. 5 is a hydraulic circuit diagram for checking an open stuck of a mixing valve in the brake system according to one embodiment of the present disclosure.

FIG. 5 is a hydraulic circuit diagram for checking an open-stuck of the mixing valve in the brake system according to one embodiment of the present disclosure.

Referring to FIG. 5, the control unit 100 opens the sixth hydraulic control valve 56 and controls the piston in the master cylinder 40 to be positioned at the end of the third chamber 40a. The control unit 100 applies the duty of the mixing valve 57 as zero and commands the mixing valve 57 to close. The control unit 100 opens and closes the valves 51, 52, 53, 54, 55 and 56 of the brake system excluding the mixing valve 57 so that pressure may be formed in the wheel cylinders 111 to 114 when the piston located in the master cylinder 40 is reversed toward the fourth chamber 40b. For example, the first hydraulic control valve 51, the fourth hydraulic control valve 54, the sixth hydraulic control valve 56, the second hydraulic control valve 52, the third hydraulic control valve 53, and the fifth hydraulic control valve 55 are closed.

After completion of each valve operation, the control unit 100 reverses the piston to a preset second position toward the fourth chamber 40b.

After a predetermined time elapses after the piston has reached the second position, it is checked whether the mixing valve 57 is a mechanical open-stuck using the first pressure sensor 92. When the mixing valve 57 is closed in the hydraulic circuit design, the brake oil discharged from the fourth chamber 40b of the master cylinder 40 passes through the sixth hydraulic pressure control valve 56 to form hydraulic pressure only in the rear wheel circuit. Accordingly, when the mixing valve 57 is closed without mechanical failure, hydraulic pressure is not formed in the front wheel circuit, and thus the first pressure sensor 92 measures no pressure. On the other hand, as in the case of FIG. 5, when the brake oil discharged from the fourth chamber 40b of the master cylinder 40 forms hydraulic pressure in the front wheel circuit through the sixth hydraulic control valve 56, the pressure is measured by the first pressure sensor 92. As a result, when a pressure exceeding a certain level is measured by the first pressure sensor 92, it may be determined that the mixing valve 57 is in a mechanical open-stuck state due to failure.

Figure 6A:
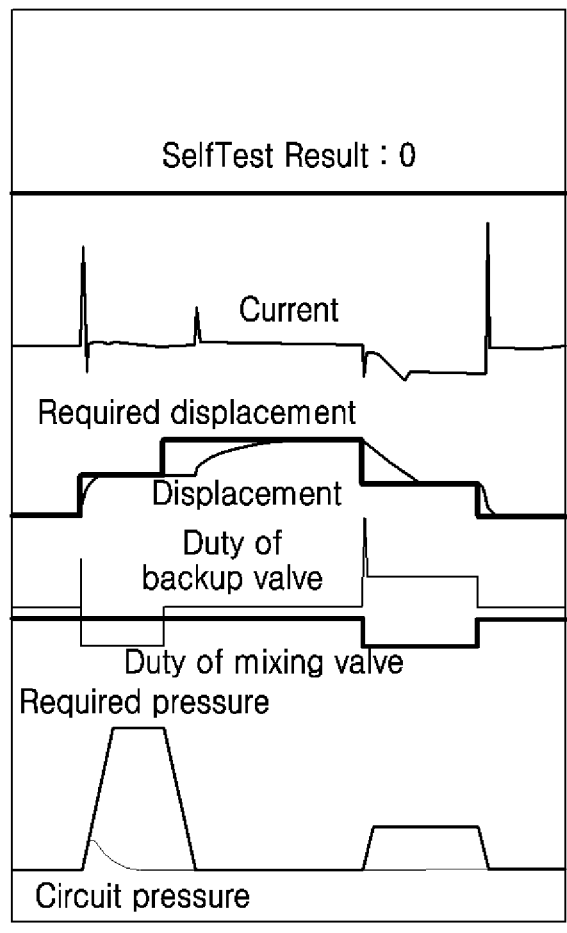
FIGS. 6A, 6B to 6C are graphs for explaining a method for determining failure of the solenoid valve in the brake system according to one embodiment of the present disclosure.
Figure 6B:
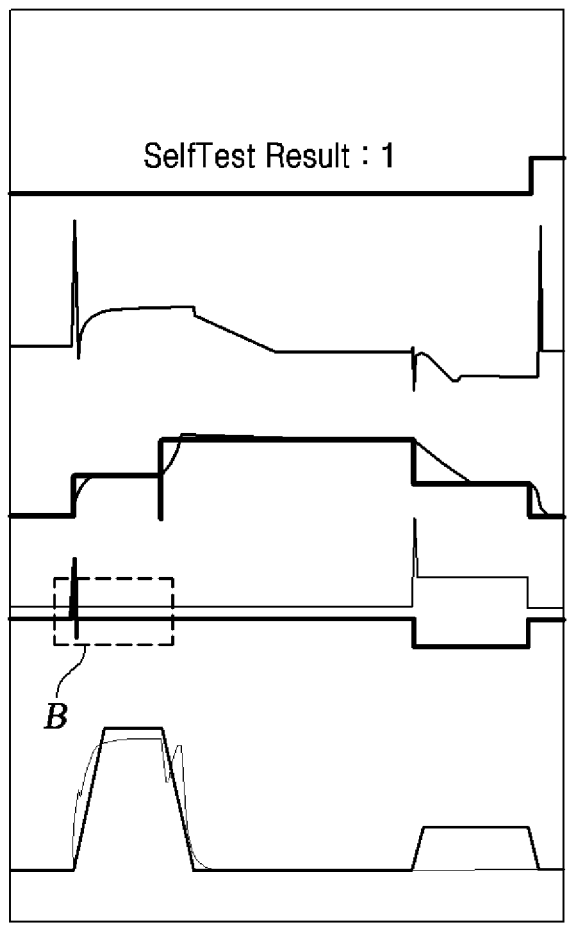
Figure 6C:
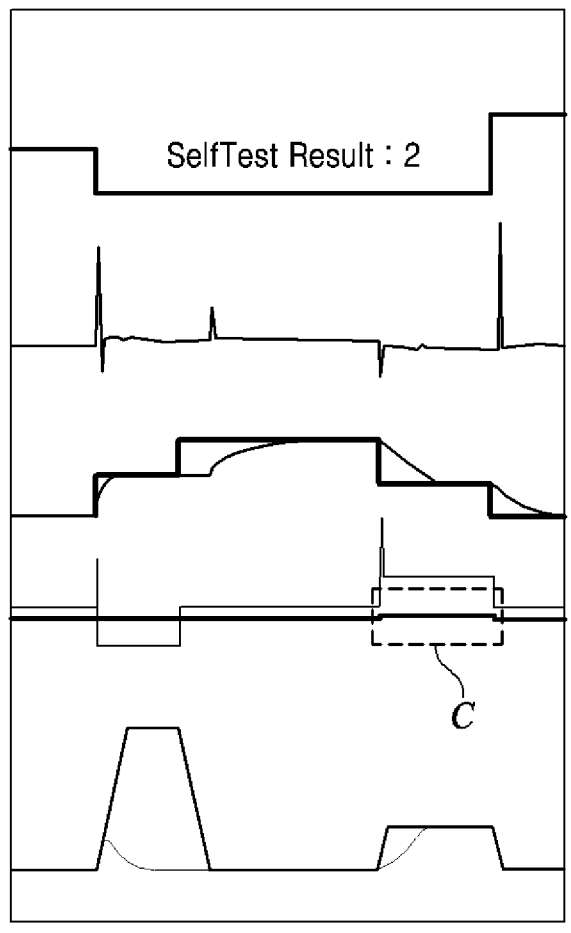

FIGS. 6A to 6C are graphs for explaining a method for determining failure of the solenoid valve in the brake system according to one embodiment of the present disclosure.

FIG. 6A is a graph illustrating a case in which the backup valve 53 and the mixing valve 57 are in a normal state without mechanical failure in the method for determining failure of the solenoid valve of the brake system according to one embodiment of the present disclosure.

Referring to FIG. 6A, it may be seen that when the duty of the backup valve 53 is applied as 0, that is, when the backup valve 53 is opened, the circuit pressure is slightly generated at the beginning and then becomes 0. The phenomenon that the circuit pressure is slightly generated at the beginning is because of a bottleneck caused by a difference in cross-sectional area between flow paths when the speed of the brake oil discharged from the third chamber 40a of the master cylinder 40 is high. Further, it may be seen that when the duty of the mixing valve 57 is applied as 0, that is, when the mixing valve 57 is closed, the circuit pressure becomes 0. As shown in FIG. 6A, the signal when there is no mechanical failure of the backup valve 53 and the mixing valve 57 is set to 0.

FIG. 6B is a graph simulating a close-stuck state of the backup valve 53 due to a mechanical failure in the method for determining failure of the solenoid valve in the brake system according to one embodiment of the present disclosure.

Referring to portion B, duty is applied to the backup valve 53 to simulate a close-stuck state of the backup valve 53. When the backup valve 53 is in the close-stuck state, it may be seen that the circuit pressure is significantly increased as compared with the graph of FIG. 6A in which the backup valve 53 is in the normal state. The signal when the backup valve 53 is in a close-stuck state due to a mechanical failure is set to 1.

FIG. 6C is a graph simulating an open-stuck state of the mixed valve 57 due to a mechanical failure in the method for determining failure of the solenoid valve in the brake system according to one embodiment of the present disclosure.

Referring to portion C, a duty is applied to the mixing valve 57 to simulate an open-stuck state of the mixing valve 57. When the mixing valve 57 is in the open-stuck state, it may be seen that the circuit pressure is significantly increased as compared with the graph of FIG. 6A in which the mixing valve 57 is in the normal state. The signal when the mixing valve 57 is in the open-stuck state due to a mechanical failure is set to 2.

In the method of determining failure of the solenoid valve in the brake system according to one embodiment of the present disclosure, the control unit 100 receives the circuit pressure sensed by the first pressure sensor 92 and compares the received circuit pressure with a preset circuit pressure in the normal state. As a result of comparison, when the circuit pressure is higher than that in the normal state, the control unit 100 determines that the backup valve 53 and/or the mixing valve 57 are in a mechanical failure state, and transmits a signal suitable for the situation to warn the driver. Even if the backup valve 53 and/or the mixing valve 57 fail, all control in the normal state is possible. In the event of a valve failure, the warning lamp is turned on while performing normal control to lead the driver to recognize the warning lamp and take an inspection for the vehicle.

According to one embodiment, the method for determining failure of a solenoid valve in a brake system can detect failure of the hydraulic valve that controls opening and closing of the flow path between the pedal cylinder and the master cylinder to secure a driver's safety.

According to one embodiment, the method for determining failure of a solenoid valve in a brake system can detect failure of the mixing valve that controls opening and closing of the flow path between the front wheel cylinder and the rear wheel cylinder to secure a driver's safety.

What is claimed is:
1. A method for determining a failure of a solenoid valve in a brake system of a vehicle, the method comprising:
    opening a backup valve that controls (1) opening/closing of a first flow path between a master cylinder and a pedal cylinder and (2) opening/closing of a plurality of valves of the brake system excluding the backup valve;

moving a piston disposed in the master cylinder to a first position and determining, using a pressure sensor, whether the backup valve is in a failure state;

closing a mixing valve that controls (1) opening/closing of a second flow path between a front wheel circuit and a rear wheel circuit and (2) opening/closing of the plurality of valves of the brake system excluding the mixing valve; and moving the piston disposed in the master cylinder to a second position and determining, using the pressure sensor, whether the mixing valve is in a failure state;

before closing the mixing valve, opening a third flow path between the master cylinder and the rear wheel circuit; and moving the piston to an end of the master cylinder in a direction toward the first position from an initial position of the piston in the master cylinder.

2. The method of claim 1, wherein opening the backup valve comprises:

setting a duty of the backup valve to zero; and opening or closing the plurality of valves of the brake system excluding the backup valve so that a pressure is formed in a plurality of wheel cylinders when the piston moves to the first position.

3. The method of claim 1, wherein determining whether the backup valve is in the failure state comprises:

detecting, using the pressure sensor, a pressure of the front wheel circuit; and determining that the backup valve is in the failure state when the detected pressure of the front wheel circuit meets a preset pressure condition.

4. The method of claim 1, wherein closing the mixing valve comprises:

setting a duty of the mixing valve to zero; and opening or closing the plurality of valves of the brake system excluding the mixing valve so that a pressure is formed in a plurality of wheel cylinders when the piston moves to the second position.

5. The method of claim 1, wherein determining whether the mixing valve is in the failure state comprises:

detecting, using the pressure sensor, a pressure of the front wheel circuit; and determining that the mixing valve is in the failure state when the detected pressure of the front wheel circuit meets a preset pressure condition.

6. The method of claim 1, further comprising determining whether a driver has left the vehicle prior to opening the backup valve.

7. The method of claim 1, further comprising notifying, to a driver of the vehicle, the failure of the backup valve when it is determined that the backup valve is in the failure state.

8. The method of claim 1, further comprising notifying, to a driver of the vehicle, the failure of the mixing valve when it is determined that the mixing valve is in the failure state.

9. A brake device for a vehicle, comprising:

a pedal cylinder connected to a reservoir and configured to generate a hydraulic pressure in response to a driver's pressing of a brake pedal, the reservoir storing brake oil;

a motor driven by an electrical signal output indicative of displacement of the brake pedal;

a master cylinder connected to the pedal cylinder and including a piston configured to move forward or backward by the motor, the master cylinder configured to generate, using the piston, a braking hydraulic pressure;

a control unit configured to detect (1) a failure of a backup valve configured to adjust opening and closing of a flow path between the master cylinder and the pedal cylinder and (2) a failure of a mixing valve configured to adjust opening and closing of a flow path between a front wheel circuit and a rear wheel circuit; and a plurality of valves provided in flow paths connecting the reservoir to a plurality of wheel cylinders configured to perform braking of respective wheels, wherein, to detect the failure of the backup valve, the control unit is configured to:

control opening and closing of the backup valve and the plurality of valves, move the piston in the master cylinder to a first position and determine whether the backup valve is in a failure state based on a in the wheel cylinders, wherein, to detect the failure of the mixing valve, the control unit is configured to:

control opening and closing of the mixing valve and the plurality of valves, move the piston in the master cylinder to a second position and determine whether the mixing valve is in a failure state based on the pressure in the wheel cylinders and wherein, before closing the mixing valve, the control unit is configured to open a third flow path between the master cylinder and the rear wheel circuit and move the piston to an end of the master cylinder in a direction toward the first position from an initial position of the piston in the master cylinder.

10. The brake device of claim 9, wherein the control unit is configured to:

set a duty of the backup valve to zero;

control opening and closing of the plurality of valves excluding the backup valve so that the pressure is formed in the wheel cylinders when the piston moves forward to the first position; and determine whether the backup valve is in a failure state when the piston moves forward to the first position.

11. The brake device of claim 10, wherein, when it is determined that the backup valve is in the failure state, the control unit configured to notify, to a driver of the vehicle, the failure of the backup valve.

12. The brake device of claim 9, wherein the control unit is configured to:

set a duty of the mixing valve to zero;

control opening and closing of the plurality of valves excluding the mixing valve so that the pressure is formed in the wheel cylinders when the piston moves backward to the second position; and determine whether the mixing valve is in a failure state when the piston moves backward to the second position.

13. The brake device of claim 12, wherein, when it is determined that the mixing valve is in a failure state, the control unit is configured to notify, to a driver of the vehicle, the failure of the mixing valve.

* * * * *